(12) United States Patent
Bhargava et al.

(10) Patent No.: US 12,459,718 B2
(45) Date of Patent: Nov. 4, 2025

(54) POLYLACTIC ACID-BASED CUSTOM CORRUGATE PACKAGING AND ASSOCIATED METHODS

(71) Applicant: Lifoam Industries, LLC, Greer, SC (US)

(72) Inventors: Saumitra Bhargava, Clarksville, MD (US); Jonathan Godfrey, Joppa, MD (US)

(73) Assignee: LIFOAM INDUSTRIES, LLC, Greer, SC (US)

( * ) Notice: Subject to any disclaimer, the term of this patent is extended or adjusted under 35 U.S.C. 154(b) by 140 days.

(21) Appl. No.: 18/477,332

(22) Filed: Sep. 28, 2023

(65) Prior Publication Data

US 2024/0199302 A1 Jun. 20, 2024

Related U.S. Application Data

(60) Provisional application No. 63/476,041, filed on Dec. 19, 2022.

(51) Int. Cl.
*B65D 81/113* (2006.01)
*B65D 65/46* (2006.01)
*B65D 81/02* (2006.01)
*B29C 65/00* (2006.01)
*B29C 65/44* (2006.01)
*B29C 65/48* (2006.01)

(52) U.S. Cl.
CPC ............ *B65D 81/113* (2013.01); *B65D 65/44* (2013.01); *B65D 65/466* (2013.01); *B29C 65/44* (2013.01); *B29C 65/48* (2013.01); *B29C 66/727* (2013.01); *B29C 66/7486* (2013.01); *B65D 2581/056* (2013.01)

(58) Field of Classification Search
CPC .. B65D 81/113; B65D 81/1275; B65D 65/44; B65D 65/466; B65D 2581/056; B29C 65/44; B29C 65/48; B29C 66/727; B29C 66/7486
USPC ............ 206/523, 591, 592, 593, 594, 524.1, 206/524.2, 524.3, 524.6
See application file for complete search history.

(56) References Cited

U.S. PATENT DOCUMENTS

| | | | |
|---|---|---|---|
| 3,278,658 A | 10/1966 | Immel | |
| 4,032,609 A | 6/1977 | Smith | |
| 4,722,944 A | 2/1988 | Mori et al. | |
| 6,358,459 B1 | 3/2002 | Ziegler et al. | |
| 7,872,056 B2 | 1/2011 | Cheung et al. | |
| 10,688,698 B2 | 6/2020 | Bhargava et al. | |
| 2003/0006519 A1 | 1/2003 | Kopp | |
| 2005/0059747 A1 | 3/2005 | Berghmans et al. | |
| 2006/0058406 A1 | 3/2006 | Matsumura et al. | |
| 2010/0029793 A1 | 2/2010 | Witt et al. | |

(Continued)

*Primary Examiner* — Jacob K Ackun
(74) *Attorney, Agent, or Firm* — Eversheds Sutherland (US) LLP (57) ABSTRACT

A method for adhering polylactic acid-based (such as polylactic acid resin (PLA) foam) custom product packaging to a corrugate surface is provided. The corrugate surface is heated to a suitable temperature and the PLA foam may be pressed against the corrugate surface for a second or seconds to rapidly adhere the PLA foam to the corrugate surface. The adhesion between the corrugate surface and the PLA foam may be sufficient to maintain the adhesion, but may also allow for the PLA foam to be removed from the corrugate surface.

25 Claims, 9 Drawing Sheets

(56) References Cited

U.S. PATENT DOCUMENTS

| | | | |
|---|---|---|---|
| 2010/0222442 A1 | 9/2010 | Prissok et al. | |
| 2013/0059938 A1 | 3/2013 | Paetz-Lauter et al. | |
| 2013/0116352 A1 | 5/2013 | Jo et al. | |
| 2021/0237953 A1* | 8/2021 | Bhargava | B65D 81/3816 |
| 2022/0111570 A1 | 4/2022 | Waggoner | B29C 44/24 |
| 2022/0281635 A1* | 9/2022 | Bhargava | B65D 81/3823 |
| 2023/0322439 A1* | 10/2023 | Nakamura | B65D 71/0088 |
| | | | 206/386 |
| 2024/0025622 A1* | 1/2024 | Bhargava | B65D 65/466 |
| 2024/0025624 A1* | 1/2024 | Bhargava | B65D 81/383 |
| 2024/0083655 A1* | 3/2024 | Bhargava | B65D 81/107 |
| 2024/0218142 A1* | 7/2024 | Atkinson | C08L 67/02 |
| 2024/0253279 A1* | 8/2024 | Bhargava | B29C 44/445 |
| 2024/0392106 A1* | 11/2024 | Bhargava | C08K 3/22 |
| 2025/0163233 A1* | 5/2025 | Bhargava | C08J 9/232 |

* cited by examiner

POLYLACTIC ACID-BASED CUSTOM CORRUGATE PACKAGING AND ASSOCIATED METHODS

CROSS-REFERENCE TO RELATED APPLICATION

This application claims priority to U.S. Provisional Patent Application No. 63/476,041, filed Dec. 19, 2022, which is incorporated herein by reference.

FIELD OF THE DISCLOSURE

This disclosure relates generally to molded foam articles and, in particular, relates to custom product packaging composed of low-density molded foam articles formed from polylactic acid and adhered to corrugate or other paper surface.

BACKGROUND

Molded foam articles are used in a variety of diverse industries including thermal insulation and protective packaging, construction, infrastructure support, foodservice, and consumer products. Molded foam articles are commonly produced from expandable polystyrene (EPS), which has a well-known manufacturing process. However, EPS-based foam articles suffer from a variety of drawbacks that prevent not only recycling the EPS article, but also repurposing the EPS article for secondary uses.

Consumer-facing foam articles such as insulated shippers are commonly used for shipping meal kits, confectionary products, cakes, other perishable goods, and pharmaceutical items such as vaccines. These insulated shippers are normally discarded by the end-user after their initial purpose has been served, and discarded EPS products contribute over 1,300 tons of waste to landfills in the United States every day.

Prior attempts to reduce molded bead foam article waste have included a shift towards biobased and compostable foam materials as alternatives to EPS. For example, polylactic acid (PLA) can be used to produce molded foam articles having insulative and protective properties equal to or superior to those of EPS, but with the added benefit of being compostable. However, molded foam articles rarely have utility in any secondary use beyond the initial application for which the molded bead foam article was made.

Creating production lines and equipment to produce protective packaging for a unique or a small number of products is wasteful. Protective kits made with polyurethane (PU) with partially cut pieces are available to increase customization of the protective packaging. By cutting or pulling apart the partially cut pieces, the foam can be adapted to the product being shipped. While this may reduce the costs of producing the protective packaging by homogenizing the manufacturing requirements of the kit, the kit creates waste polyurethane foam because of the need to cut or remove pieces to fit the application. Furthermore, the packaging remains ill-defined for the specific product being shipped. One-of-a-kind articles such as musical instruments also need easily customizable protective packaging having a high modulus (compared to flexible PU foam).

Hybrid packaging including foam, corrugate, and tape; foam, tape, and film; or molded pulp, corrugate, and tape are also common. EPS or another foam is often used to cover an article being protected. Once covered, the article may then be placed in corrugate or film. Alternatively, the packaging process may start with a corrugated box and EPS or another foam may be added to the base and sides of the box. However, this may be a difficult process that requires time and often results in failures. The foam either must be held in place or attached to the article being protected with tape, pressure-sensitive adhesive or hot-melt adhesive. Protecting the goods being shipped is important to end user satisfaction. Not following the process correctly can lead to breakage, complaints, and added expense. Many of the packaging steps are challenging to automate, especially aspects of the process in which tape is used.

Additionally, the use of corrugated boxes in conventional packaging may include a number of associated challenges. One challenge is the requirement to use secondary packaging materials, which may result in recycling and compositing difficulties. For example, a corrugated box requires adhesive tapes and often requires a full lacquer coating and clay content within the corrugated material to minimize moisture uptake. Furthermore, effective impact and vibration protection using EPS, EPP, and PE foam requires the corrugated material and foam to be tightly fit. This results in challenges in placing a product to be shipped within the corrugated box, as well as removing the product from the corrugated box. Corrugated inserts and molded pulp are considered green materials but suffer from high modulus requiring more corrugate and molded pulp to achieve desired impact and vibration protection. This increases the overall size of the corrugated box.

Furthermore, in conventional product packaging, large volumes of low density foam may be used to provide protection for the product during shipment. Low density foams such as EPS, expanded polypropylene (EPP), polyethylene foam (PE), and PU rapidly fill up a trash receptacle whenever a consumer receives an appliance, furniture, television, fragile goods, windows, shower doors, candles, etc. Not only that, but the foam also occupies more than five times the volume of the product within the shipping container (e.g., box, etc.). When receiving a shower door at home, the packaging around the door includes EPS foam held on the glass shower door with fiber tape. In addition, the entire system may be wrapped in film and then sealed again with fiber tape. This further illustrates the amount of material that may be required to be disposed subsequent to shipment of a product.

Accordingly, improved product packaging is needed for overcoming one or more of the technical challenges described above.

BRIEF DESCRIPTION OF THE DRAWINGS

The detailed description is set forth with reference to the accompanying drawings. The use of the same reference numerals may indicate similar to identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Custom product packaging is provided herein including one or more molded bead foam articles that have been adhered to a first corrugated surface by heating the first corrugated surface and pressing the first molded bead foam article against the first corrugated surface. In particular, it has been unexpectedly discovered that forming the one or more molded bead foam articles from polylactic acid enables the molded bead foam article to be adhered to the corrugated surface without secondary adhesive and further enables the formation of custom product packaging consisting entirely of corrugate and the polylactic acid-based molded bead foam without adhesives, glue, or tape.

Throughout this disclosure, various aspects are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

As used herein, the term "about" with reference to dimensions refers to the dimension plus or minus 10%.

Overview of the Adhesion Process

It was unexpectedly discovered that when a corrugated surface is rapidly heated to between (and inclusive of) 250 to 450° F. and a piece of polylactic acid resin (PLA) foam is pressed on the heated corrugated surface, adhesion occur between the PLA molded foam and the heated corrugated surface within a second or seconds. The heating process of the corrugated surface may be rapid enough that the bulk of the corrugated object remains at a room temperature (for example a human operator may be able to hold one portion of the corrugated object while heating another portion of the corrugated object to which the PLA foam is adhered). In this manner, a PLA molded foam may be quickly adhered to the corrugated surface by heating the corrugated surface and pressing the PLA molded foam against the corrugated surface. This process may be performed without requiring an additional adhesive to provide between the foam and the corrugated object to which the foam is being adhered. The process may instead involve heating the PLA molded foam surface, or heating both the corrugated surface and the PLA molded foam surface. The adhesion force may be sufficiently strong that the PLA molded foam may remain adhered to the corrugated surface, however, the PLA molded foam may be removable from the corrugated surface if sufficient force is applied to pull the PLA molded foam from the corrugated surface.

As used herein, the phrase "corrugate," "corrugated object," "corrugated surface," and the like refer to corrugated cardboard or corrugated cardboard surfaces, such as corrugated cardboard commonly used in boxes for shipping and storage. The adhesion solutions presented herein similarly apply to paper honeycomb, corrugate honeycomb, paperboard, cardstock, and other paper-based surfaces. Thus, the use of the phrase "corrugate" is intended to similarly encompass these other paper-based surfaces. The decision to use the phrase "corrugate" only, to the exception of other phrases, is intended for brevity only and is not to be interpreted as limiting unless otherwise noted.

As described in further detail herein, several solutions have been developed that offer superior protection and more efficient unboxing capabilities using the rapid adhesion process between PLA foam and corrugated cardboard or paper. The solutions described herein may be used by EPS, EPP, PE foam, molded pulp, and corrugated inserts as well with the use of secondary adhesives. The ease of removing PLA foam from corrugate also provides the benefit of not impacting the recyclability of corrugate. Furthermore, PLA foam is itself recyclable and compostable.

The packaging systems described above are commonly used for protecting small appliances, larger appliances, glassware, lighting fixtures, ceramics, electronics, devices, and other fragile goods during shipments.

The examples and tests conducted (as described through Examples 1-8) show multiple combinations in which PLA foam combined with paper-based packaging offers a lighter, superior performing, and sustainable alternative to conventional packaging materials. Tests show ways in which PLA foam may be manipulated to further reduce weight and transportation costs while improving the ability to package and unpackage the product. The full boxing can be easily automated, requiring fewer steps than conventional automated corrugate box assembly. The boxing can be adapted to the size of products being shipped for online retailers or distributors.

Custom Product Packaging

Custom product packaging is disclosed herein. In some embodiments, the custom product packaging includes a first molded bead foam article comprising polylactic acid (PLA or PLA). In some embodiments, the first molded bead foam article may comprise PLA-based molded bead foam. As used herein, a "molded bead foam article" may refer to an article formed from a polymeric bead foam that has gone through an expansion and bead molding process, such as a PLA molded foam. Thus, reference herein to "a first molded beam foam article" (or like terms) may similarly refer to a PLA molded foam. The article may be in the form of a two-dimensional panel or a three-dimensional structure such as a box. In some embodiments, the first molded bead foam article has been adhered to a first corrugated surface by heating the first corrugated surface and pressing the first molded bead foam article against the first corrugated surface.

In some embodiments, the first molded bead foam is adhered to a corrugated surface by heating the surface and pressing the at least one molded bead foam article against the corrugated surface. In some embodiments, the surface may include at least one of: corrugated cardboard and paper. This approach may also be applied to any other type of material described herein and even materials not described herein. That is, the process described herein may allow for the rapid adhesion of a PLA molded foam to a vast array of different types of materials. The adhesion approach described herein may also be automated.

In some embodiments, the first molded bead foam article is pressed against the first corrugated surface for less than a second. In some instances, the first molded bead foam article may be pressed against the first corrugated surface for less than a few seconds (for example, less than five seconds). That is, in some instances, "rapid" adhesion may refer to adhesion that occurs between the PLA foam and the surface to which the PLA foam is being adhered in less than a second or seconds (however, this is merely exemplary). In this manner, the corrugated surface may only need to be heated for a short period of time to perform the adhesion, enabling rapid formation of custom product packaging.

In some embodiments, the corrugated surface is heated to enable adhesion. In some embodiments, the PLA foam surface is heated to enable adhesion. In some embodiments, both the corrugated surface and the PLA foam surface are heated to enable adhesion.

In some embodiments, the first molded bead foam article is removable from the corrugated surface. That is, the first molded bead foam article may be rapidly adhered to the corrugated surface for use in various use cases as described herein or otherwise, while allowing for the foam to be removed from the corrugated surface when the foam is no longer required. As a non-limiting example, after shipment of a product has been completed, the foam may be removed from the corrugate for disposal, such as recycling or composting. For example, pressing the PLA molded foam against the corrugated surface while the corrugated surface is heated may result in the PLA molded foam article being adhered to the corrugated surface with a bond equivalent to approximately 2-200 of pounds peel strength. That is, adhesion process described herein achieves a bond that is sufficiently strong to survive the shipment process, while also being sufficiently weak to allow for the PLA molded foam to be removed from the corrugated surface. In this manner, the packaging may be formed using only two materials (PLA molded foam and corrugate), enabling simpler recycling and/or composting. The adhesion process described herein also allows for the PLA molded foam to be removed from the corrugated material to which it is adhered without residue being left on the surface of the corrugated material, unlike conventional packaging materials, such as tape or other adhesives.

Figure 1:
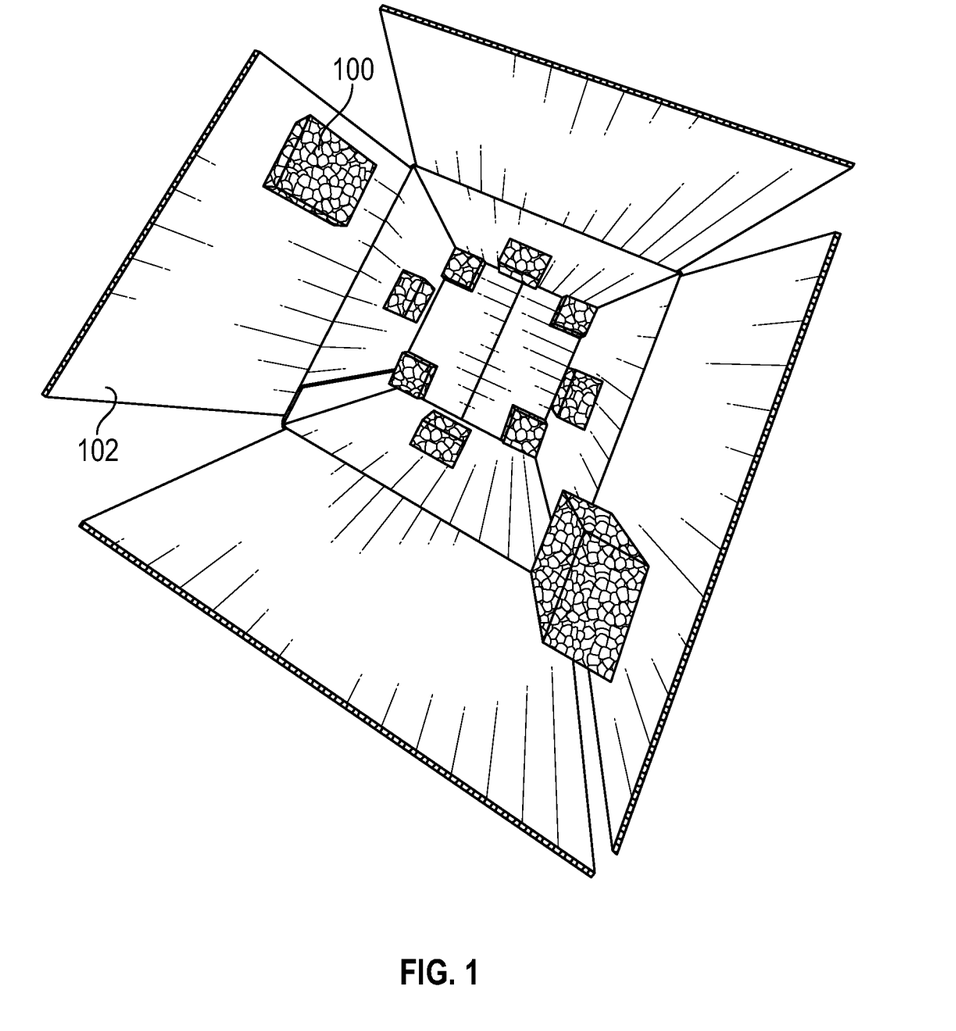
FIG. 1 is a plurality of foam pieces adhered to a corrugated box in accordance with an embodiment of the disclosure.

In some embodiments, the customer product packaging further includes a second corrugated surface. In some embodiments, a second molded bead foam article has been adhered to the second corrugated surface by heating the second corrugated surface and pressing the second molded bead foam article against the second corrugated surface. As shown in FIG. 1, a plurality of pieces of PLA foam pieces 100 may be adhered to various surfaces of a corrugated box 102. In FIG. 1, PLA foam pieces 100 are attached to each wall of the corrugated box 102 to serve as protection as opposed to commonly used end caps. These foam pieces use less material for protection and result in less material to be recycled, composted, or thrown away (i.e., less waste). The placement of the PLA foam pieces 100 as shown in FIG. 1 is merely exemplary and any other number of PLA foam pieces 100 may similarly be adhered to the corrugated box 100. Any other number of PLA foam pieces 100 may also be provided. Furthermore, the size and positioning of the PLA foam pieces 100 within corrugated box 102 may be chosen specifically for a particular product so provide tailored protection to that product.

In some embodiments, the first corrugated surface is a corrugated flap of the custom product packaging, and wherein the first molded bead foam article remains adhered to the corrugated flap as the corrugated flap is actuated to open and close the custom product packaging. As described further with respect to Example 3, conventional packaging involves utilizing tightly-fitting outer cartons to ensure secure positioning of protective elements (such as trays and corner protectors) against the enclosed product and corrugate. This often results in an unfavorable unboxing experience for users. Removing the protected item may require the dismantling of the outer carton. Furthermore, once removed, attempting to reinsert the item into the original packaging becomes challenging.

Typical product packaging involves tightly-fitting outer corrugate cartons to ensure secure positioning of protective elements (such as trays and corner protectors) against the enclosed product and corrugate. However, this practice of surface contact and compression significantly impacts the performance of these protective elements. While this strategy effectively reduces the risk of product damage during transit, it often results in an unfavorable unboxing experience for users. Removing the protected item, such as a small appliance, from the packaging can prove arduous, necessitating the dismantling and, in some instances, destruction of the outer carton. Furthermore, once removed, attempting to reinsert the item into the original packaging becomes challenging, sometimes even impractical, for the end user.

Figure 3A:
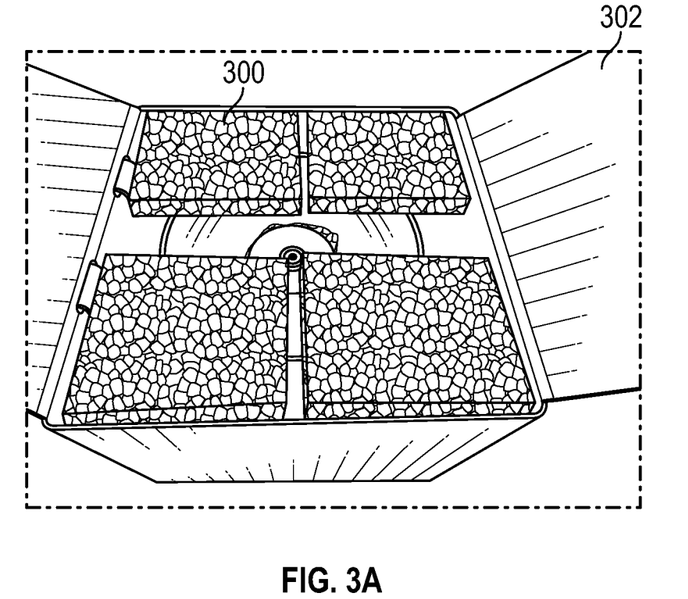
FIGS. 3A-3C is PLA foam adhered to a corrugated box in accordance with an embodiment of the disclosure.
Figure 3B:
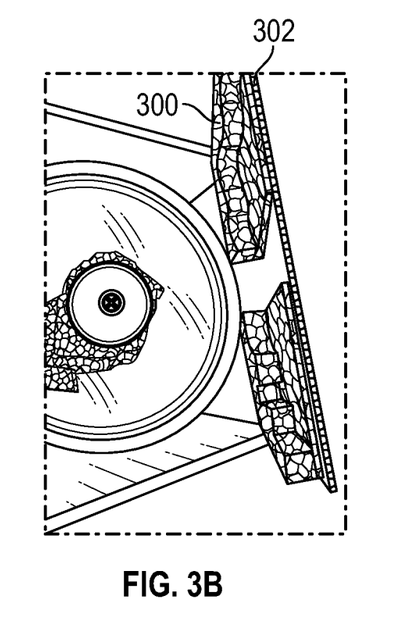

By integrating the PLA foam elements, such as corner protectors and touchpoints, with the outer portion of the corrugated package, easier loading and unloading is enabled. When the end user lifts the corrugated flap, these protective elements are designed to move in tandem with the corrugated flap. In this manner, the foam packaging is more easily moved for removal of the product from the package. Through the strategic attachment of corner protectors or touchpoints to the outer carton, these components remain affixed even when the carton is folded, thereby ensuring their continued presence and efficacy. Consequently, when the user decides to store the product back in its initial packaging, the protective components seamlessly retain their positions within the packaging structure, streamlining the process and safeguarding the product with minimal hassle. While a typical design which uses a tight-fitting outer carton and trays may take up several seconds or minute for removal, this design described herein allows removal in fraction of the time. Even more so, placing the article back into the original packaging can take time and effort in typical design packaging, while the design described herein takes a few seconds to place the article back into place before closing the corrugate flaps. This adhesion of the PLA foam to the flap or flaps of the corrugated box is shown in at least FIGS. 3A-3B. FIG. 3A depicts the PLA foam within the corrugated box, while FIG. 3B depicts the same PLA foam adhered to the surface of the corrugated box.

The loading of protective packaging combined with the product loading requiring protective packaging into a corrugate box is challenging. Manually performing the loading takes time and requires a person to place the protective foam and corrugate or molded pulp, followed by placing the product and the protective top. Placing a super-assembly (i.e., product and protective insulation) into a corrugate box is also challenging as there is little space between interior of the corrugate and super-assembly. Air displacement during the lowering of the super-assembly can shift protective foam pieces and may require tape or film to prevent excessive displacement of protective packaging.

A top entry robot similarly struggles with product loading as there is limited space between corrugate interior and the super-assembly. The robot may need gripping points, which require physical space within the package.

To address this challenge, typical solutions involve a corrugate box open at the top and bottom that is lowered on top of the super-assembly supported by a base smaller the corrugate opening. The top flaps of the corrugate are subsequently sealed before flipping the product and corrugate so that the bottom side can be sealed. However, lowering the corrugate onto the super-assembly still creates air-resistance and may result in foam or another package being blown off. Thus, secondary adhesion such as film or tape is often used to attach foam to the article being protected.

In contrast, the approach described herein enables an alternate assembly process. As the protective foam are adhered to the corrugate without tape or other adhesive means, a person can simply place the product on one of the corrugate sides and build the box around the product. This results in superior fit of the article within the box, with a small gap (less than ¼") between protective pieces is eliminated. As a result, the box size may be reduced, enabling the combination of PLA and corrugate to act as a combined near-monolithic assembly with more effective protection provided to the product. Furthermore, the need for tape is eliminated because the adhesion of PLA to corrugate sufficiently "seals" the packaging closed.

For example, in a box including a product to be protected (such as a display monitor) with conventional EPS foam end brackets, there is a slight gap (¼") between the EPS foam end brackets and the corrugate. This small gap changes the mechanics of the system (product, foam, corrugate, etc.). If the gap is absent, the system is much stiffer as the entire system acts as a single composite piece to deter deflection and may result in lower G-forces upon dropping. With the gap, the article and foam move within the corrugate so the stiffness is reduced and can result in corrugate deformation and product damage from higher G-forces. The articles and methods described herein allows the entire system to behave as a single system without gaps, which results in superior protection.

A conventional corrugated box may include cutouts for flaps, two ends that are twice as thick as the other four faces, and a seam within the corrugated interior. All these features have an impact on material wastage, causing poor fit and undesirable differences in mechanical behavior in box corners and faces. The seam causes fit issues (e.g., direction and size) for protective material along with differences in mechanical properties of the corrugate face with the seam. These ignored features influence drop test as higher stiffness faces deform less that the other faces while the other faces deform more resulting in denting of corrugate and more importantly corrugate-initiated twist and G-forces on the article being protected. ISTA standards call out the orientation of the seam and box top and bottom in drop tests to account for these differences.

Figure 6A:
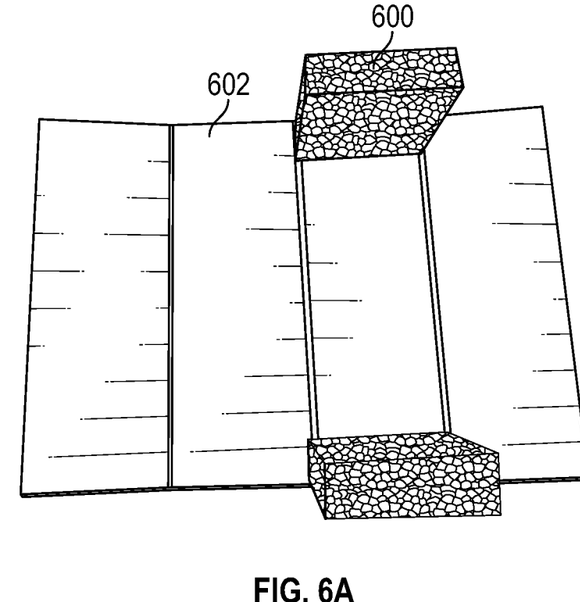
FIGS. 6A-6B is another package formed using PLA foam in accordance with an embodiment of the disclosure.
Figure 6B:
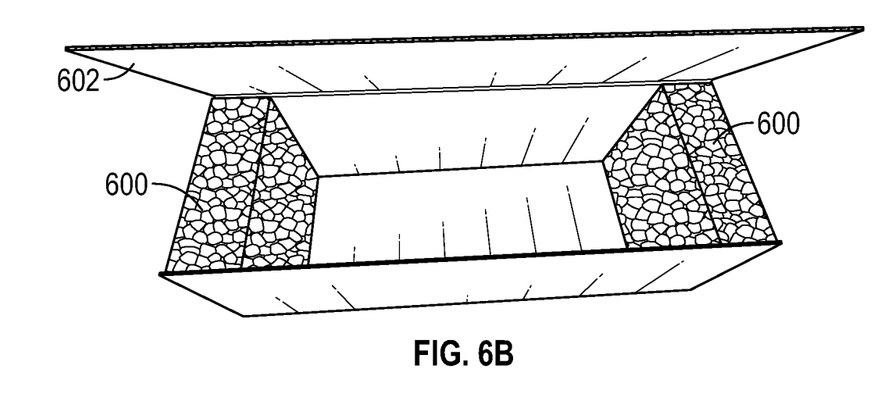

In some embodiments, the first molded bead foam article comprises a first wall of the custom product packaging and wherein the second molded bead foam article comprises a second wall of the custom product packaging. For example, as shown in FIGS. 6A-6B, two end pieces of foam 600 were attached to a corrugated material 602. In this example, no product was added. However, a product which only requires end support, such as a vase or lighting fixture, may potentially be added between the foam 600. The corrugated material 602 shown in FIGS. 6A-6B has no seams, no tape, and only a slight gap that may be used to separate corrugate from foam. In other words, the adhesion of PLA foam to corrugate not only secures the end pieces of foam to the corrugate, but the adhesion of PLA foam to the corrugate "seals" the box closed. This has the additional benefit of simply reducing the amount of corrugate used in a given package. Furthermore, forming a custom box having any size from corrugate is enabled with this embodiment.

In some embodiments, heating the first corrugated surface is performed using a heating element, wherein the heating element comprises a heated roller, a heated press, a hot air gun, an infrared-emitting device, a conduction heater, or an induction spot heater. Any of these heating elements may be used to heat a surface of a material such that the PLA foam may be pressed against the surface to adhere the PLA foam to the surface. In some embodiments, the first corrugated surface is heated to a temperature between (and inclusive of) 250° F. and 450° F., for example. Heating the surface to such a temperature may allow for the rapid adhesion of the PLA foam to the surface. These are merely examples of types of heating elements and any other type of element capable of heating a surface may also be used. These heaters can be powered with electricity, kerosene, heating oil, steam, heat transfer fluid, solar, natural gas, for example.

In some embodiments, only a portion of the first corrugated surface is heated to adhere the at least one molded bead foam article to the surface. That is, not all of the surface of the material to which the PLA foam is to be adhered needs to be heated to adhere the PLA foam to the surface. For example, when testing this adhesion process using a corrugate piece, one end of a corrugate was rapidly heated while holding the other side with a hand. During this test, the surface at the tip was hot enough for PLA foam adhesion without the holding edge increasing noticeably in temperature.

In some embodiments, a size of the portion of the first corrugated surface is less than a surface area of a portion of the at least one molded bead foam article that is adhered to the surface. That is, the total adhesion force between the PLA molded foam and the surface may be modified (for example, to modify the amount of force required to remove the foam from the surface) by changing the cross-section of the contact surface between the PLA molded foam and the surface to which the PLA molded foam is being adhered. This may be accomplished by limiting the area of the surface of the material that is heating relative to the overall surface area of the surface of the PLA foam that is being adhered to the surface of the other material. For example, if an eight square inch foam is desired to be adhered to corrugate, only two square inches of the surface of the corrugate may be headed. This results in a smaller area of adhesion between the PLA molded foam and the corrugate, and thus a smaller amount of force is required to remove the foam from the corrugate. This may also be accomplished by creating specialty foam shapes such as ridges and adhering the foam only at the ridge to the corrugate (or other material).

In some embodiments, heating the at least one surface of the first molded bead foam article is performed without producing flammable gas.

In some embodiments, the first molded bead foam article is at least partially machined. It has been unexpectedly discovered that machining a molded bead foam article formed from PLA produces up to 50% less waste than a comparable molded bead foam article formed from expandable polystyrene, and the dust that is produced is easily compostable and biodegradable. As used herein, "machined" refers to the process of cutting, drilling, milling, die-cutting and/or shaving the molded bead foam article in order to produce smaller molded foam article(s) or to shape the molded foam article. Machining processes may involve the use of lathes, cutting tools, hot wire, hot knives, rotary tools, die-cutting punches, drilling etc. When lathe, CNC, or water-jet machining EPS-based articles, micro and macroparticles of EPS are generated in the form of dust. This dust is not only undesirable as a messy byproduct of the machining process, but EPS-based foam dust remains incapable of recycling or composting. In addition, when machining PLA-based articles in a typical milling process using a fine cutting tool rotating at 30,000 rpm, there is a 40-60% reduction in fine particles that are produced compared to EPS-based molded articles under the same machining conditions.

In some embodiments, the first molded bead foam article is an existing molded bead foam article having an initial intended use, such as an insulative piece of PLA-based bead foam included in a product packaging to product a product. In some embodiments, the existing piece of PLA-based bead foam was originally used as thermal protection for temperature-sensitive products, as impact protection for fragile products, or a combination thereof. Rather than discarding this PLA-based bead foam article, it may be used as described herein by adhering it to corrugate for insulating products within the product.

The rapid adhesion process using PLA foam by heating a surface may provide a vast array of benefits in a number of different use cases. As a first example, the volume of foam used within packaging may be reduced by a significant amount (for example, by 30-90% or any other amount), resulting in less waste. As another example, the use of the foam in this manner may also improve the impact and vibration protection of the goods being shipped. As yet another example, the adhesion process provides the ability to create any size thermal shipper at the packing facility. As yet another example, the adhesion process achieves superior impact protection, especially over corrugate using foam inserts. As yet another example, the adhesion process enables the inclusion of paper-based labels without a separate adhesive. As yet another example, the adhesion process enables the use of paper as tamper-evidence seals. As yet another example, the adhesion process provides superior protection for products such as furniture, appliances, and windows without the use of tape or stretch wrap.

In some embodiments, the custom product packaging includes at least one molded bead foam article comprising expandable polylactic acid (PLA or PLA). In some embodiments, the at least one molded bead foam article has been adhered to paper by heating the paper and pressing the at least one molded bead foam article against the paper.

Methods for Producing Custom Product Packaging

Methods for producing custom product packaging are also disclosed herein. In one aspect, the methods include producing custom product packaging as described above. In another aspect, the method includes adhering a first molded bead foam article to a first corrugated surface by heating the first corrugated surface and pressing the first molded bead foam article against the first corrugated surface. In some embodiments, the first molded bead foam article comprises a plurality of foam beads comprising polylactic acid. In some embodiments, both the molded bead foam article and the corrugated surface are heated. In some embodiments, the molded bead foam article is heated and corrugated surface is not heated.

In some embodiments, the at least one molded bead foam article and the corrugated surface are adhered together without using an adhesive. In some embodiments, the at least one molded bead foam article is removable from the corrugated surface. In some embodiments, the heating element comprises a heated roller, a heated press, a hot air gun, an infrared-emitting device, a conduction heater, or an induction spot heater. In some embodiments, the corrugated surface is heated to a temperature between or including 250° F. and 450° F. In some embodiments, only a portion of corrugated surface is heated to adhere the at least one molded bead foam article to the corrugated surface. In some embodiments, a size of the portion of the corrugated surface is less than a surface area of a portion of the at least one molded bead foam article that is adhered to the corrugated surface. In some embodiments, the at least one molded bead foam article is pressed against the surface for less than a second. In some embodiments, heating the at least one surface of the first molded bead foam article is performed without producing flammable gas. These are merely examples of types of heating elements and any other type of element capable of heating a surface may also be used. These heaters can be powered with electricity, kerosene, heating oil, steam, heat transfer fluid, solar, natural gas, for example.

EXAMPLES

The disclosure may be further understood with reference to the following non-limiting examples.

Example 1: PLA Protective Trays/Corners/Touchpoints

Figure 2:
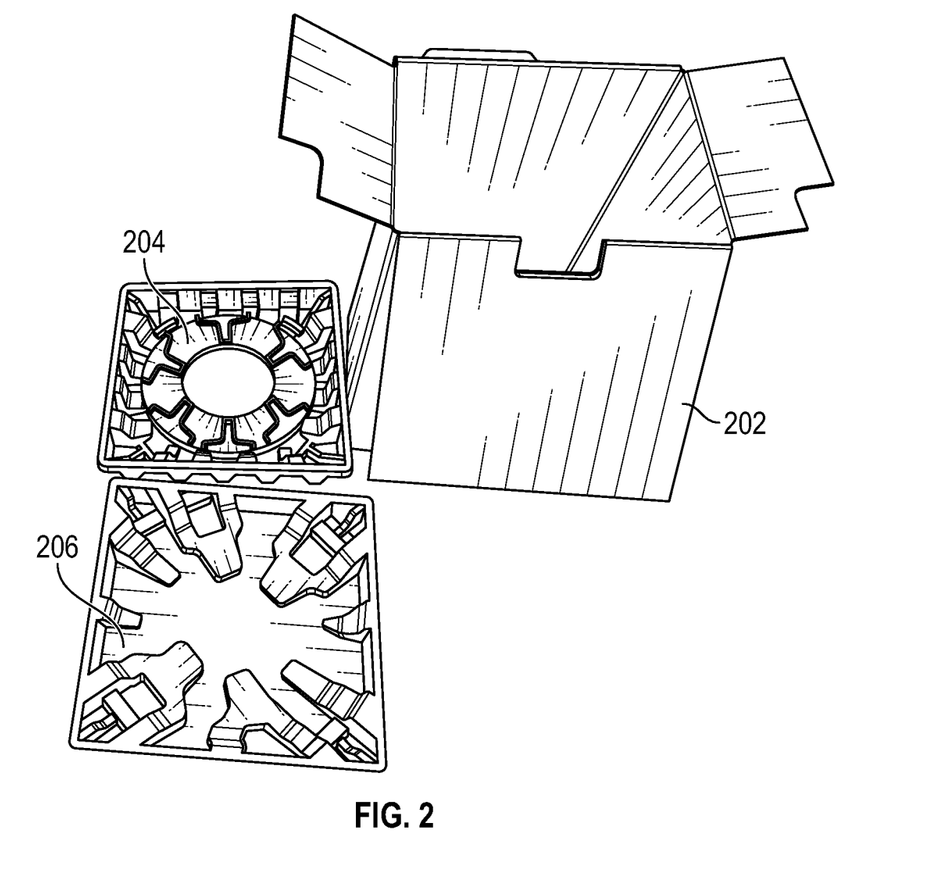
FIG. 2 is a product packaging in the prior art using molded pulp.

A slow cooker (a small appliance weighing 2130 g) was used for drop testing by placing the slower cooker into custom packaging formed as described herein. The standard packaging for the small appliance included two molded pulp trays for protecting the product during drops, which may occur in the transit environment. The standard packaging is depicted in FIG. 2 and includes outer corrugate box 202, top molded pulp insert 204, and bottom molded pulp insert 206. A first test involved taking outlines of these molded pulp trays and constructing matching trays including PLA foam. In other words, this test focused on a simple substitution of one material for another having the same shape. Thus, this test provided baseline performance data for PLA foam compared to conventional protective packaging solutions. Performance was determined with an accelerometer that measured the G-force experienced by the packaging when dropped from a height of 30 inches. In this test, a higher G-force indicates a more "sudden" stop and is an indication of poorer cushioning and more impact force being transmitted to the product. For each sample design, three drops were conducted with five-minute intervals between drops.

It is common in the industry to create protective packaging trays in which a product is nestled between two protective ends. While this provides adequate protection, this type of packaging performs best when the outer carton is tightly fit, but this tighter fit makes removing the product from the packaging difficult or may require the corrugate to be deformed or destroyed in some way. This prevents reuse of the packaging material. While a protective tray may be created to cover the entire bottom and top surface of a product, the contact points and areas which experience stress during drop are usually in a few select spots. In contrast with these conventional methods, by placing squares of foam material in specific areas, similar protection may be provided while using less material.

Figure 3C:
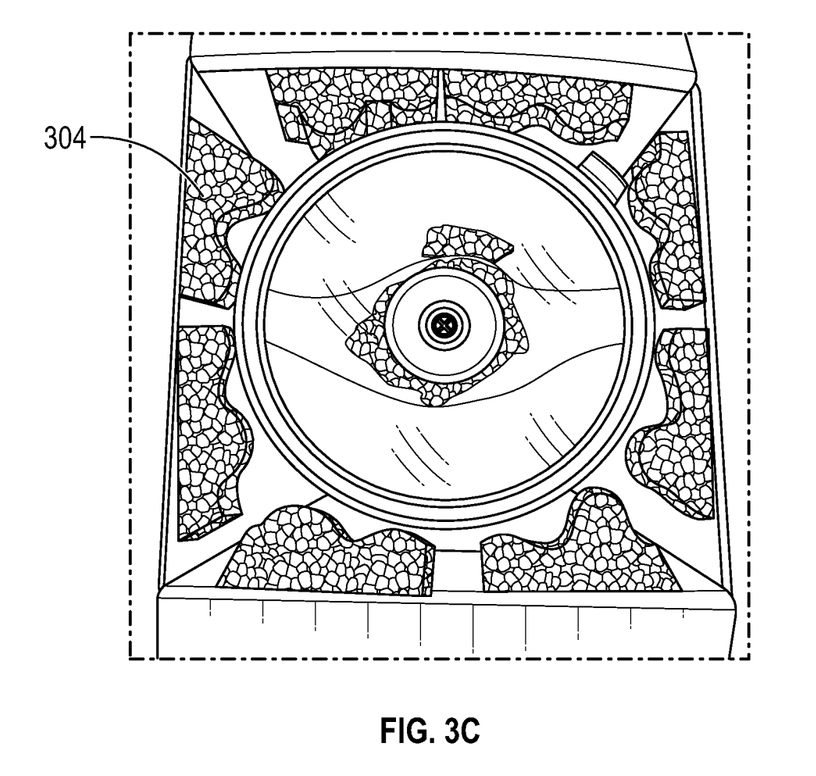

Using the original design of the molded pulp trays (204 and 206 in FIG. 2), the stress areas were determined and PLA foam pieces were constructed which only correspond to these high stress areas. In the first iteration, depicted in FIGS. 3A-3B, corner protectors 300 were created and positioned within the box 302 which provided cushioning in each corner of the appliance. A second iteration, depicted in FIG. 3C, was performed with 16 smaller corner protectors 304 (8 replacing the top molded pulp tray, visible in FIG. 3C, and 8 replacing the bottom molded pulp tray) were designed which act as "touchpoints" of foam between the outer carton and the appliance being protected. These touchpoints were designed with a small lip that would contact the appliance being protected to provide optimal protection and holding with as little material as possible. It should be noted that the weight of the appliance being protected was 2130 grams with the outer carton adding another 220 grams. The volume of the outer carton was 534 cubic inches.

The results of these drops are shown below in Table 1.

TABLE 1

Drop Test Results

| | Average G-Force of three drops (26" drop height) (G) | Highest G Force of three drops (26" drop height) (G) | Weight of Protective Components (grams) |
|---|---|---|---|
| Molded Pulp Protective Tray | 2.6 | 4.5 | 216 |
| PLA Protective Tray | 0.7 | 1.2 | 94 |
| Integrated PLA Corner Protectors | 1 | 2.2 | 75 |
| Integrated PLA "Touch points" | 1.3 | 2.2 | 42 |

As shown in Table 1, all three instances in which PLA foam was used was associated with a lower weight package and resulted in reduced G-force over that of the conventional molded pulp packaging. The PLA packaging provided weight reductions of 55% to 80%, while maintaining the G-force at less than 50% lower that of molded pulp packaging. The G-force measurements also indicate that an even greater reduction in material usage is possible if maintaining the same G-force standards as those experienced in the molded pulp sample.

Example 2: Ship-In-Own-Container (SIOC) Implementation

Another exemplary container was created using a framed award shipped by an online framing company. The frame was 15.5"×12"×2.5" with an inner carton around the frame along with an additional outer carton. The inner carton dimensions were 16"×13.5"×3" and the outer carton was 13.5"×11"×16.9". This outer carton was filled with packaging peanuts to protect the inner carton since the inner carton only contained the frame itself with four injected molded plastic corners.

Figure 4A:
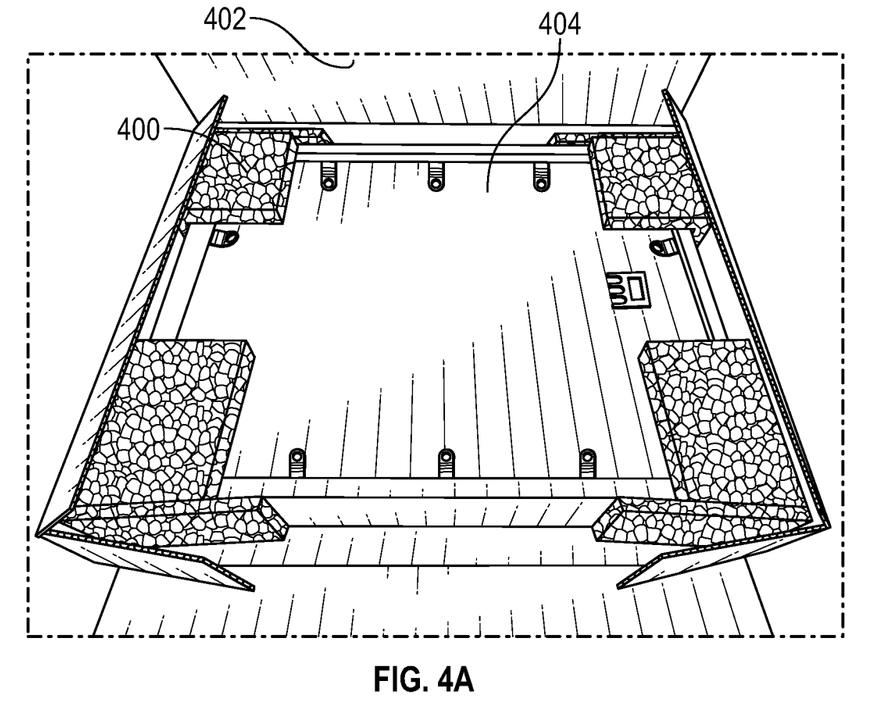
FIGS. 4A-4C is PLA foam adhered to corners of a corrugated box in accordance with an embodiment of the disclosure.
Figure 4B:
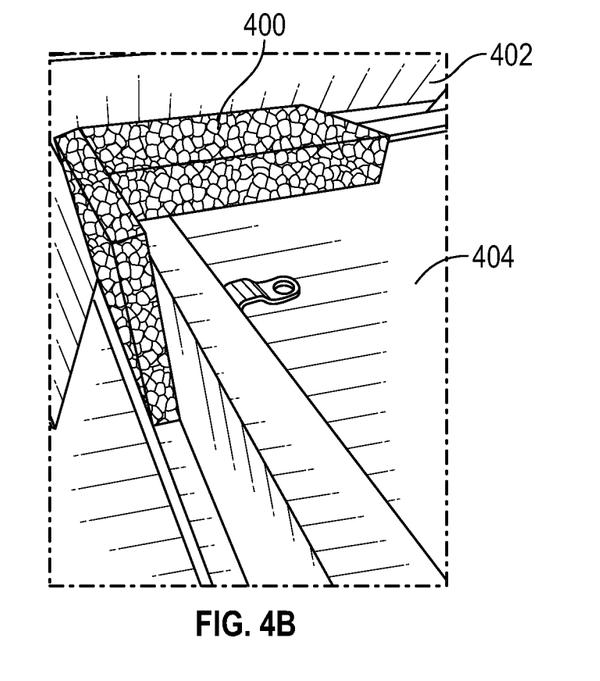
Figure 4C:
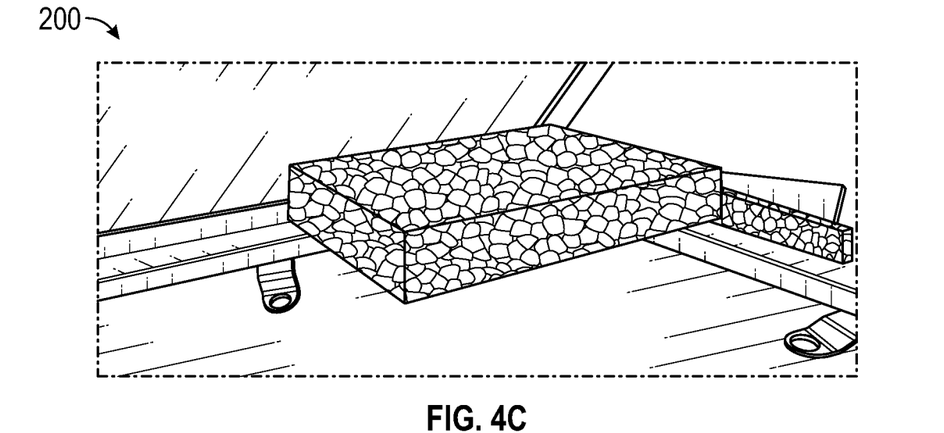

Corner protectors were constructed using PLA foam to match the shape of injection-molded corner protectors, as depicted in FIGS. 4A-4C. In FIGS. 4A-4C, PLA corner protectors 400 are secured by attaching these to corrugate within box 402 to protect framed award 404. The PLA corner protectors 400 added resiliency and cushioning. The foam protectors were 14 grams compared to the 31-gram injected molded plastic. Additionally, these protectors enabled using the smaller inner carton as the sole product packaging without requiring packaging peanuts or the external larger corrugate.

Example 3: Analysis of Shipping Costs and Emissions

The framed award in Example 2 was analyzed to compare the shipping costs and associated emissions between the original packaging and the PLA-based packaging described above. The original packaging used injection molded plastic corners within a first corrugate carton having dimensions 16"×14"×3", which itself was packaged with packing peanuts in a second corrugate carton having dimensions 14"×11"×17". The overall weight of this package was 5.9 lbs. The modified packaging uses PLA-based corner protectors to replace the molded plastic corners, within only the first corrugate carton having dimensions 16"×14"×3". The overall weight of this modified packaging was 4.6 lbs.

The shipping cost and associated emissions (in $CO_2$ equivalent, or CO2e) were simulated. The results are shown in Table 2.

TABLE 2

Shipping Cost and Emissions Comparison

| | Ground shipping | Air Shipping |
|---|---|---|
| UPS Cost for Small Business - Modified Packaging | $18 | $ 90 |
| CO2e - Modified Packaging | .76 Kg | 3.2 Kg |
| UPS Cost for Small Biz - Original Packaging2 | $28 | $263 |
| CO2e - Original Packaging | 2.1 Kg | 9.0 Kg |

As shown in Table 2, the cost to ship the modified packaging is 35-66% lower than the original packaging, and the associated emissions are around 64% lower than shipping the original packaging.

Example 4: Packaging Based on Corrugate with Foam Sides

Figure 5:
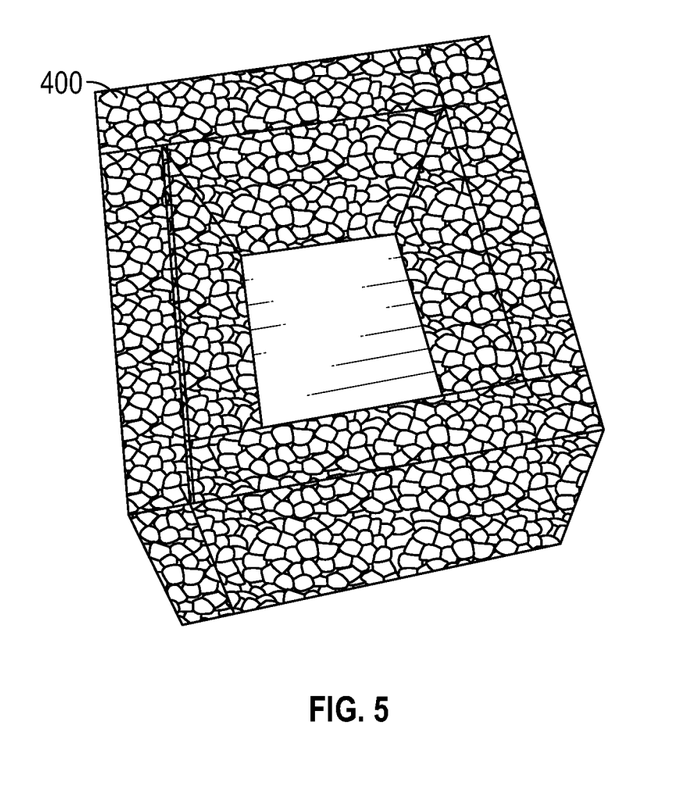
FIG. 5 is a package formed using PLA foam in accordance with an embodiment of the disclosure.

FIGS. 5 and 6A-6B depict two alternative approaches to build a shipping box which reduces corrugated use, eliminates the use of tape, and develops an option which may be easily scaled to produce custom, appropriately-sized shipping boxes. Unexpectedly, the boxes made with PLA and fluted corrugate had improved weight carrying capacity and deflection-improvement over that of corrugated boxes alone.

One variation of a box is shown in FIG. 5 where foam pieces serve two functions: they protect the object within the box, but also seal the box with no visible tape. This design can also serve as a tamper evident seal. A thinner foam piece would tear upon opening leaving a surface which cannot be put together and thus creating a tamper evident seal. In this example, four PLA foam panels with dimensions of 6"×5.25"×0.75" were attached together to form a four-sided open box using the adhesion methods previously described. A C-Flute corrugated board top and bottom with dimensions of 6"×6" were attached by heating corrugated board and foam sides on a platen set to 350 degrees F. for five seconds before being pressed together. The same process was conducted for the second corrugate end. After constructing the article, weights were applied to the edges to determine the level of rigidity provided by the foam sidewalls and adhesion as opposed to a corrugated box of similar dimensions.

The corrugated box which was selected for comparison has a certified edge crush rating of 32 lbs and was also constructed with C-flute corrugated board. For both the corrugated box and the box constructed with PLA foam, deformation and bending of boxes was recorded based on location and amount of weight.

When a 10 lb weight was applied at the center of the sidewall during testing rather than being evenly applied across the entire face of the corrugated board, deformation was observed on the conventional corrugated box. However, applying the 10 lb weight in a similar manner to the box including the PLA foam did not cause deformation in either the foam sidewalls or the corrugated board sidewalls. Lastly, a 25 lb weight was applied such that its weight was applied in the center of the sidewalls and the corrugated box showed even further deformation, folding, and near tearing underneath the weight. The 25 lb weight did not cause deformation on either the foam sidewalls or the corrugated board sidewall in the box with the PLA foam.

In FIGS. 6A-6B, the ends of the boxes may be PLA foam, while the four sides may include made of a continuous sheet of corrugate which is bent at score points. The end result is zero waste of corrugated board. There are no flaps on the corrugate and if the process involves loading the articles, one can seal without tape through the adhesion of the corrugate to the PLA foam.

In these designs, the end user may need to separate the foam and recycle the corrugated material. The strength to remove the foam from corrugate can be adjusted based on the amount of heat provided to the corrugated surface, the surface area heated, and the length of time the heat is provided. Depending on the product being packaged, the adhesion strength can be adjusted between 5-45 lbf (lb-force), for example.

Corrugate is available in a roll form and may be cut to size. In this example, a right-sized box is made without use of tape, seam, and an optional small flap. Another example with foam edges and weight tested. In this example, a flat sheet of C-Flute corrugate was scored so it could be folded easily.

As shown in FIGS. 6A-6B, two end pieces of foam 600 were attached. In this example, no product was added. However, a product which only requires end support, such as a vase or lighting fixture, may potentially be added between the foam 600. The corrugated material 602 shown in FIGS. 6A-6B has no seams, no tape, and only a slight gap that may be used to separate corrugate from foam. The outside dimensions of this box are 5"×5"×20". Such a box is challenging to produce using conventional EPS and even corrugate alone. The other advantage of this method is that no expensive tooling for corrugate is needed. The resulting box is unexpectedly strong and may withstand 80 lbs of weight without showing any deformation.

Example 5: Box Made with PLA Foam with Laminated Cardstock

It has been unexpectedly discovered that packaging may eliminate corrugated cardboard completely by replacing corrugate with PLA foam adhered to a paper outer surface. The two solutions allow creation of boxes which have mechanical properties which are not sensitive to moisture or humidity levels and can even withstand getting wet. The packaging in these examples only offers a differentiated way to deliver high value goods in a more attractive box. Such packaging may be used to ship higher and lower cost articles in differentiated packaging.

Figure 7A:
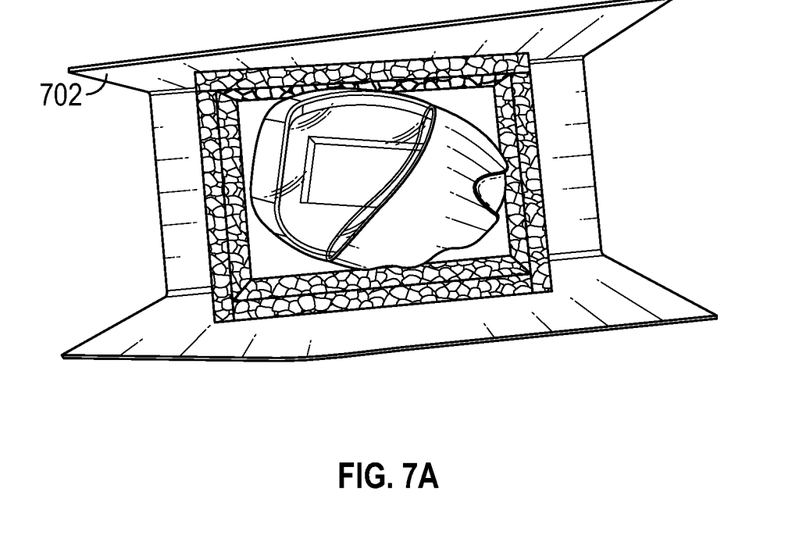
FIGS. 7A-7B is PLA foam adhered to paper in accordance with an embodiment of the disclosure.
Figure 7B:
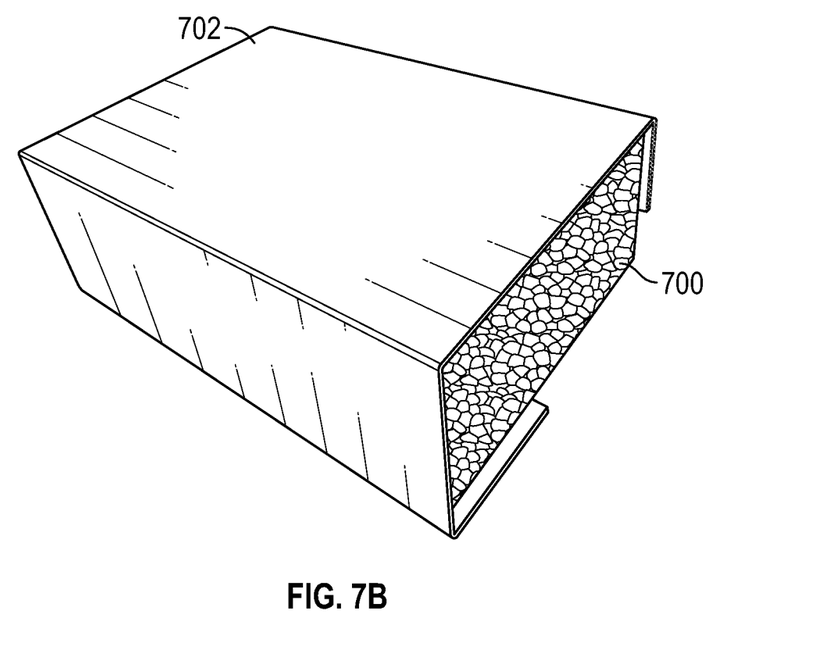

In this example, a box was made with 110 lb cardstock around a ¾" thick PLA foam panel (shown in FIGS. 7A-7B including foam 700 and cardstock 702). The laminate of cardstock and foam was scored using a steel rule allowing the material to be folded. The box, even without the sealed ends, supported 45 lbs of weight on any of the sides with no bowing or deformation. Sealing the box provides further strength to the box. The box had external dimensions of 3.5"×3.5"×8.

Example 6: No Corrugate, Premium Box

The ability to achieve a strong bond of PLA foam with a paper led to the development of a premium box for perfume. A box with dimensions of 3.75"×5"×3" with a sidewall of ⅜" was constructed using molded PLA panels and card stock. The resulting box protects the perfume while closely matching the lowest possible shipping dimension and with a premium look. This package can be any color and be fully commercially compostable. This example used colored cardstock; however, printed, textured, diecut, or other types of cardstock can be used. This box can be used to ship perfume directly to the consumer's home in an attractive box while eliminating all corrugate.

Example 7: Thermal Shipper Using Corrugate and PLA Foam Panels

Another example application of this process of adhering PLA foam to corrugate as described herein is the ability to form any size thermal shipping container. These shipping containers may be prepared without tooling or molds and may be customized as needed. Shipping molded thermal shipping containers is bulky while shipping flat panels is easier. By shipping flat panels and flat corrugate, significantly more packaging may be shipped simultaneously. This is not possible with typical product packaging that relies on flexible liners with poor sealing at edges, low compression resistance, and no sealing features unless glue or another adhesive is introduced.

Figure 8:
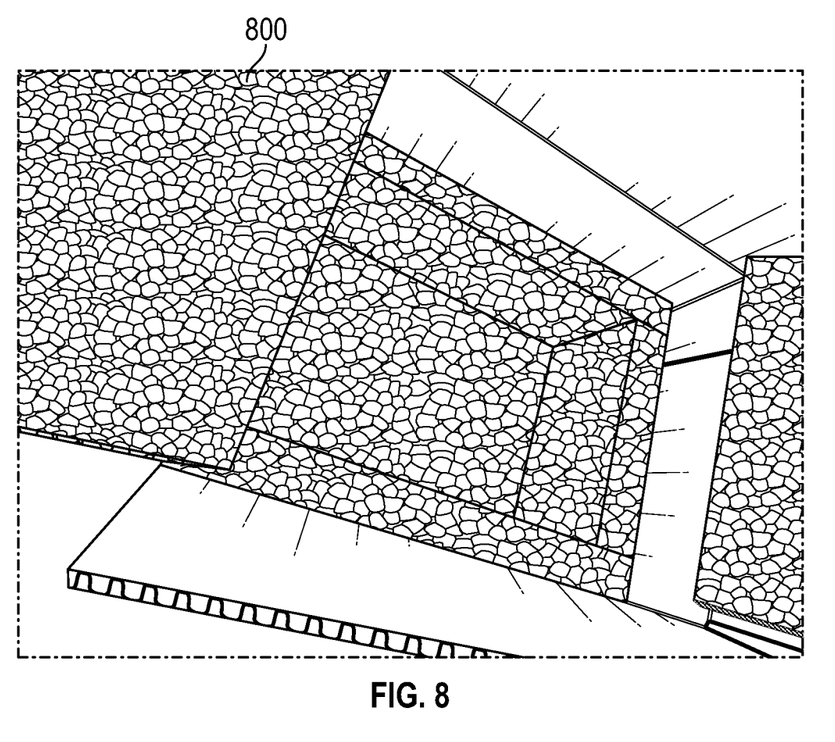
FIG. 8 is a thermal carrier including PLA foam in accordance with an embodiment of the disclosure.

FIG. 8 shows a thermal shipping container including PLA foam 800. The top foam is only attached on one of the flaps allowing the shipper to be opened and closed like a hinged cooler. Several variants are possible where foam has tapers allowing this box to reused. Options for producing a fold flat cooler are also possible. The container in FIG. 8 may be produced from an initially-flat piece of corrugate that is folded into a box shape, and an initially-flat piece of PLA that is cut into an appropriate number of pieces of appropriate size to adhere to and fit within the corrugate box.

Example 9: Plain Paper Label Attached to PLA

Conventional labels that attach to foam are made with petrochemical adhesives that do not biodegrade. Instead, it has been unexpectedly discovered that heating a typical sheet of 20 lb white paper having an address label or shipping information may be directly attached to PLA. Another advantage of paper labels is that they may even be applied around curved edges or even square corners. Thus, the shippers described herein having at least one externally exposed surface of PLA may include a paper label adhered directly to the PLA, thereby imparting relevant shipping and/or product information without introducing any adhesives or glue.

While the disclosure has been described with reference to a number of embodiments, it will be understood by those skilled in the art that the disclosure is not limited to such embodiments. Rather, the disclosure can be modified to incorporate any number of variations, alterations, substitutions, or equivalent arrangements not described herein, but which are commensurate with the spirt and scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements or functional capabilities. Additionally, while various embodiments of the disclosure have been described, it is to be understood that aspects of the disclosure may include only some of the described embodiments. Accordingly, the disclosure it not to be seen as limited by the foregoing described, but is only limited by the scope of the appended claims.

That which is claimed is:

1. A custom product packaging comprising a first molded bead foam article comprising polylactic acid, wherein the first molded bead foam article has been adhered to a first corrugated surface by heating (i) the first corrugated surface, (ii) a surface of the first molded bead foam article, or (iii) a combination thereof, and pressing the first molded bead foam article against the first corrugated surface.

2. The custom product packaging of claim 1, wherein the first molded bead foam article and the first corrugated surface are adhered together without using an adhesive or tape.

3. The custom product packaging of claim 1, wherein the first molded bead foam article is removable from the first corrugated surface.

4. The custom product packaging of claim 1, wherein the first corrugated surface is a corrugated flap of the custom product packaging, and wherein the first molded bead foam article remains adhered to the corrugated flap as the corrugated flap is actuated to open and close the custom product packaging.

5. The custom product packaging of claim 1, further comprising a second corrugated surface, wherein a second molded bead foam article has been adhered to the second corrugated surface by heating the second corrugated surface and pressing the second molded bead foam article against the second corrugated surface.

6. The custom product packaging of claim 5, wherein the first molded bead foam article comprises a first wall of the custom product packaging and wherein the second molded bead foam article comprises a second wall of the custom product packaging.

7. The custom product packaging of claim 6, wherein the custom product packaging is in the form of a six-sided box, wherein the first molded bead foam article comprises a first side of the six-sided box and the second molded bead foam article comprises a second side of the six-sided box.

8. The custom product packaging of claim 6, further comprising one or more additional molded bead foam articles adhered to the first corrugated surface and/or the second corrugated surface, wherein the custom product packaging includes between 3 and 5 molded bead foam sides.

9. The custom product packaging of claim 1, wherein heating the first corrugated surface is performed using a heating element, wherein the heating element comprises a heated roller, a heated press, a hot air gun, an infrared-emitting device, a conduction heater, or an induction spot heater.

10. The custom product packaging of claim 1, wherein the first corrugated surface is heated to a temperature between or including 250° F. and 450° F.

11. The custom product packaging of claim 1, wherein only a portion of the first corrugated surface is heated to adhere the first molded bead foam article to the first corrugated surface.

12. The custom product packaging of claim 11, wherein a size of the portion of the first corrugated surface is less than a surface area of a portion of the first molded bead foam article that is adhered to the first corrugated surface.

13. The custom product packaging of claim 1, wherein a g-force experienced by a payload within the custom product packaging is around 50% lower than a payload within a conventional product packaging of an identical volume.

14. The custom product packaging of claim 1, wherein a weight of the custom product packaging is between 55% to 80% lower than a conventional product packaging of an identical volume.

15. A method for producing custom product packaging comprising:
adhering a first molded bead foam article to a first corrugated surface by heating the first corrugated surface and pressing the first molded bead foam article against the first corrugated surface,
wherein the first molded bead foam article comprises a plurality of foam beads comprising polylactic acid.

16. The method of claim 15, wherein the first molded bead foam article and the first corrugated surface are adhered together without using an adhesive.

17. The method of claim 15, wherein the first molded bead foam article is removable from the first corrugated surface.

18. The method of claim 15, wherein the first corrugated surface is a corrugated flap of the custom product packaging, and wherein the first molded bead foam article remains adhered to the corrugated flap as the corrugated flap is actuated to open and close the custom product packaging.

19. The method of claim 15, further comprising a second corrugated surface, wherein a second molded bead foam article has been adhered to the second corrugated surface by heating the second corrugated surface and pressing the second molded bead foam article against the second corrugated surface.

20. The method of claim 19, wherein the first molded bead foam article comprises a first wall of the custom product packaging and wherein the second molded bead foam article comprises a second wall of the custom product packaging.

21. The method of claim 15, wherein heating the first corrugated surface is performed using a heating element, wherein the heating element comprises a heated roller, a heated press, a hot air gun, an infrared-emitting device, a conduction heater, steam or heat transfer fluid heated platen, or an induction spot heater.

22. The method of claim 15, wherein the first corrugated surface is heated to a temperature between or including 250° F. and 450° F.

23. The method of claim 15, wherein only a portion of the first corrugated surface is heated to adhere the first molded bead foam article to the first corrugated surface.

24. The method of claim 15, further comprising adhering paper to an exposed PLA surface, wherein the paper has identifying information.

25. The method of claim 15, further comprising adhering paper to a seam between the first corrugated surface and the PLA, wherein the paper is configured to act as a tamper-evident seal.

* * * * *